C. P. SMITH.
VALVE.
APPLICATION FILED JULY 12, 1920.
1,406,096.
Patented Feb. 7, 1922.
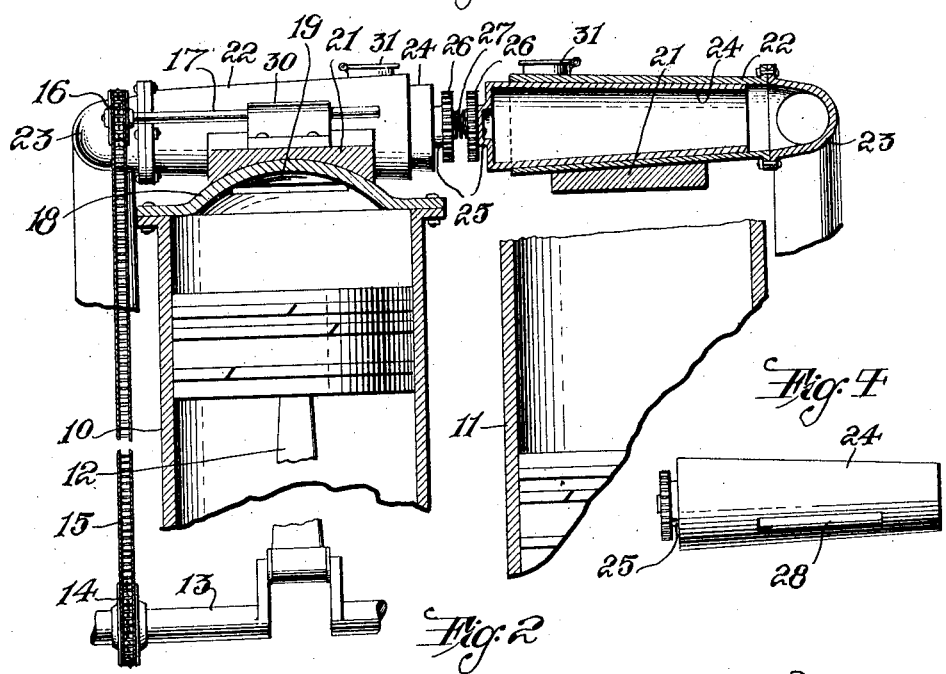
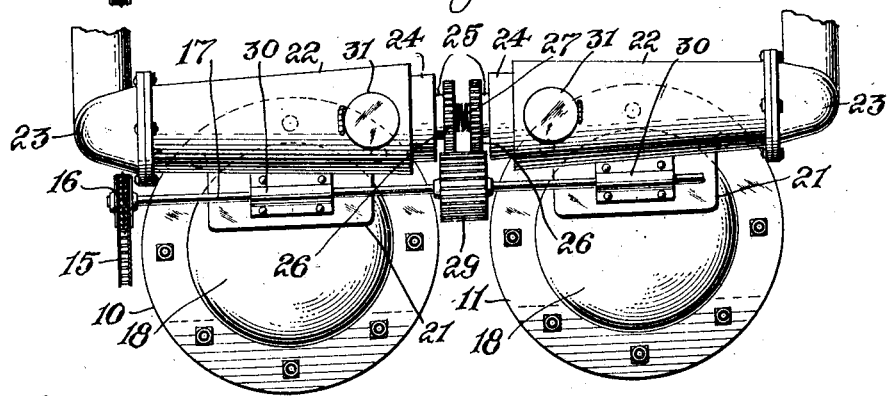
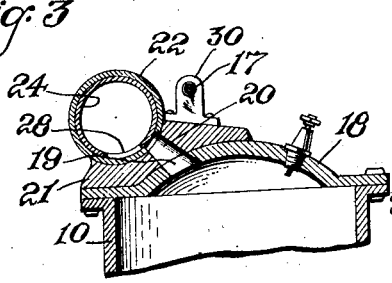
Charles P. Smith, Inventor
By Thomas R. Harney, Attorney

UNITED STATES PATENT OFFICE.

CHARLES P. SMITH, OF WHITE PINE, TENNESSEE, ASSIGNOR OF ONE-THIRD TO BALWIN HARLE, OF MORRISTOWN, TENNESSEE, AND ONE-THIRD TO JOHN G. MOORE, OF WHITE PINE, TENNESSEE.

VALVE.

1,406,096.   Specification of Letters Patent.   Patented Feb. 7, 1922.

Application filed July 12, 1920. Serial No. 395,483.

*To all whom it may concern:*

Be it known that I, CHARLES P. SMITH, a citizen of the United States of America, residing at White Pine, in the county of Jefferson and State of Tennessee, have invented certain new and useful Improvements in Valves, of which the following is a specification.

My present invention relates generally to valves, and more particularly to valves for internal combustion engines, my object being the provision of a structure which is capable of noiseless action and which will develop greater area of opening into a cylinder than is possible by means of the tappet actuated valves at present utilized.

A further object is the provision of a valve structure in which the valves will be maintained in effective condition at all times with continuous compensation for wear.

In the accompanying drawings in which I have illustrated the preferred construction for carrying out my invention, Figure 1 is a sectional side view showing a pair of internal combustion cylinders, provided with my improved valve construction, one of the cylinders and one of the valves being partly broken away.

Figure 2 is a top plan view thereof,

Figure 3 is a vertical transverse section, and Figure 4 is a detail side view of one of the valve members removed.

Referring now to these figures, I preferably apply the valves constructed in accordance with my invention, in pairs in connection with pairs of internal combustion cylinders, the latter indicated at 10 and 11 in Figure 1, having their pistons as usual joined by connecting rods 12 to a crank shaft 13 the latter of which I preferably provide with a sprocket wheel 14 connected by a sprocket chain 15 to the sprocket wheel 16 of an overhead valve actuating shaft 17 which parallels the crank shaft and extends above the cylinders 10 and 11 as well as above cylinders of a motor containing more than two cylinders.

In the present instance I have shown the cylinder heads 18 provided with slotted openings 19 at one side of their centers, paralleling the shaft 17 and communicating with channels 20 through the bases 21 of hollow tapering valve casings 22 having inner smooth surfaces and placed with their enlarged open ends opposite one another. To the smaller outer ends of these casings, which are preferably flanged for the purpose, are secured manifold pipes or branches 23 through which combustible gas may be supplied to the smaller open ends of hollow tapering valves 24 rotatable in interfitting relation within the casings 22, each of which valves is closed at its larger end and is there provided with a shouldered trunnion 25 on which is secured a gear wheel 26.

The valves 24 of the adjacent cylinders 10 and 11 are in axial alinement with the extremities of their trunnions 25 in adjacent relation so that by the use of a spring 27 whose ends telescope trunnions 25 and bear against the gears 26, the valves 24 will be pressed outwardly away from one another and the tension of the spring thus utilized to take up wear from time to time as the valves rotate in their casings.

Each of the valves 24 has a lengthwise slot 28 in its wall adapted in the rotation of the valve to come into registry with the cylinder head slot 19 and it is thus obvious that owing to the possiblity as far as length of the slot is concerned the area of the opening into the cylinder for either intake or exhaust purposes may be greatly increased over the ordinary area and quick opening and closing still secured.

The gears 26 of the valves of each pair are engaged by a single gear 29 of considerable width, secured on the shaft 17, the latter of which may be rotatably supported in bearings 30 carried by the bases 21 of the valve casings 22, although it is obvious these bearings may be made integral with the cylinder heads if so desired and the valve casings likewise made integral or attached separately as desired.

Each of the valve casings 22 is preferably provided with an oil cup 31 adjacent to its enlarged end from which lubricant works downwardly between the engaging walls of the valve and its casing for the full length of the valve so as to maintain the parts in thoroughly lubricated condition, it being obvious that when so maintained, their operation will involve minimum friction and will be practically noiseless particularly if the several parts mentioned are enclosed in valve housing plates such as now commonly utilized upon overhead valve motors.

In the present instance I have described but a single pair of the valves in connection with a single pair of combustion cylinders, but it is obvious that this is capable of duplication throughout a wide number of cylinders, requiring but a single valve actuating shaft as long as the several pairs of cylinders are in line. In case of a motor of V-type there will of course be two valve actuating shafts, both geared as previously described from a single crank shaft.

I claim:

1. The combination with adjacent cylinders of an internal combustion engine having a crank shaft, of lengthwise slotted valve casings of hollow tapering form disposed in coaxial relation on the cylinders and with their large ends adjacent to one another, hollow valves of similar shape rotatably interfitting the casings, having open small ends and closed large ends provided with axially projecting trunnions, gears secured on the trunnions, a spring extending between and engaging the trunnions of the valves to press the latter snugly into the casings, a valve actuating shaft geared to the crank shaft, and a gear on the said crank shaft engaging both of the valve carried gears, as described.

2. A pair of valve casings of hollow oppositely tapering form having lengthwise slots, hollow tapering valves having slotted walls interfitting the said casings, gears secured to the said valves adjacent to one another, a spring connecting the valves and tending to force the same away from one another and snugly within the casings at all times, and a single gear engaging the gears of both valves whereby to simultaneously rotate the latter and permit of independent axial shifting movement thereof.

3. A pair of oppositely disposed valve casings of hollow tapering form having lengthwise slots and open ends and having their large ends adjacent to one another, hollow tapering valves rotatably interfitting said casings, having slots in their walls and open at their small ends, gears carried by the large ends of the valves adjacent to one another, a spring between said valves to shift the valves into their casings, and a valve actuating shaft having a single gear engaging both of the gears of the valves to rotate the same and permit of their axial shifting movement.

In testimony whereof I have affixed my signature.

CHARLES P. SMITH.